United States Patent [19]
Goto et al.

[11] Patent Number: 6,097,445
[45] Date of Patent: *Aug. 1, 2000

[54] WHITE BALANCE SELF-ADJUSTING APPARATUS FOR USE IN COLOR DISPLAY

[75] Inventors: Kenji Goto; Hiroshi Karasuda, both of Yokohama; Takeo Hagiwara, Tokyo, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/828,349

[22] Filed: Mar. 28, 1997

[30] Foreign Application Priority Data

Mar. 29, 1996 [JP] Japan ................................. 8-077464

[51] Int. Cl.[7] .............................. H04N 9/73; H04N 5/68
[52] U.S. Cl. ..................... 348/655; 348/656; 348/380; 348/379; 348/678
[58] Field of Search .................................... 348/380, 381, 348/382, 379, 805, 691, 677, 678, 189, 191, 173, 377, 687, 655, 656, 657

[56] References Cited

U.S. PATENT DOCUMENTS

| | | | |
|---|---|---|---|
| 4,298,885 | 11/1981 | Okada | 348/679 |
| 4,516,152 | 5/1985 | Willis | 348/657 |
| 4,523,233 | 6/1985 | Tallant, II | 348/379 |
| 4,554,578 | 11/1985 | Willis | 348/379 |
| 4,599,642 | 7/1986 | Willis | 348/379 |
| 4,742,387 | 5/1988 | Oshima | 358/29 |
| 5,204,748 | 4/1993 | Lagoni | 348/565 |
| 5,258,828 | 11/1993 | Sano et al. | 348/658 |
| 5,400,086 | 3/1995 | Sano et al. | 348/678 |
| 5,512,961 | 4/1996 | Cappels, Sr. | 348/658 |
| 5,726,540 | 3/1998 | Klink | 315/383 |

*Primary Examiner*—John K Peng
*Assistant Examiner*—Linus H. Lo
*Attorney, Agent, or Firm*—Oblon, Spivak, McClelland, Maier & Neustadt, P.C.

[57] ABSTRACT

A color display with a white balance self-adjusting function, including a DC-voltage-level/gain adjusting circuit for adjusting, on the basis of adjustment data, the DC voltage level and the gain of each of R, G and B primary color signals, thereby outputting the adjusted signals. Also includes is a CRT driving circuit responsive to the output signals of the DC-voltage-level/gain adjusting circuit for outputting CRT driving signals to drive the color CRT of the display, and a cathode current detecting circuit for detecting currents flowing through the cathode electrodes of the color CRT. Further a micro-controller for applying black and white reference level voltages, at predetermined points of time, to the DC-voltage-level/gain adjusting circuit to perform adjustment, comparing detection values from the cathode current detecting circuit, with preset reference values, generating data on the basis of the comparison results, storing the generated data in the non-volatile memories, and reading and supplying the stored data as adjustment data to the DC-voltage-level/gain adjusting circuit is included.

8 Claims, 4 Drawing Sheets

WHITE BALANCE SELF-ADJUSTING APPARATUS FOR USE IN COLOR DISPLAY

BACKGROUND OF THE INVENTION

This invention relates to an apparatus for performing a white balance self-adjustment, which is for use in a color TV display or in a color monitor for a personal computer.

In the field of color TV displays, it is necessary, before putting TV display products to market, to adjust the white balance of each product by setting the DC voltage level and gain of each color signal output of the three primary colors R (Red), G (green) and B (Blue) on the basis of the cut-off characteristics of a color CRT (Cathode Ray Tube) incorporated in the product.

In the prior art, the state of white balance of the product is detected by monitoring the screen of the CRT with a TV camera, etc., then the detected value is fed back to a computer system for adjustment or to an adjusting person, where the value is compared with a preset reference value, and the DC voltage level and the gain of each of the R, G and B color outputs are adjusted on the basis of the comparison result.

In the case of performing the adjustment manually, variable resistors incorporated in a DC voltage level and gain adjusting circuit (hereinafter referred to as a "DC-voltage-level/gain adjusting circuit") for adjusting the DC voltage level and the gain are manually adjusted. On the other hand, in the case of performing the adjustment using the adjusting computer system, adjustment data is supplied to a video signal-processing integrated circuit through a data bus, incorporated therein, to rewrite data therein.

As mentioned above, the above-described prior method requires a TV camera, an adjusting computer system or an adjusting person. Moreover, in the prior method, the white balance characteristics cannot be self-adjusted to compensate aged deterioration of the CRT after the TV display is put to use.

In light of this, the conventional color TV display additionally employs a cathode current detection circuit so as to enable the display to detect a cathode current of the CRT corresponding to a reference signal output from the video signal processing integrated circuit, and employs a method for converting a detected cathode current to a detection value for each of RGB electron guns, then comparing the converted value with a preset reference value, storing the comparison result in a capacitor, and adjusting the DC voltage level and the gain of each of the R, G and B color outputs on the basis of the stored voltage value.

However, although this method enables self-adjustment of white balance to compensate usual aged deterioration of the CRT characteristics, it does not enable the self-adjustment in the manufacturing stage of the display, and further requires an integrated circuit of a large scale since a capacitor of a large capacitance is necessary for storing an analog voltage.

In addition, in the method, the voltage stored in the capacitor is substantially 0 V and therefore the CRT screen intensely flashes in white immediately after the TV display is turned on. To deal with this, a particular countermeasure circuit is necessary.

BRIEF SUMMARY OF THE INVENTION

It is the object of the invention to provide a white balance self-adjusting apparatus for use in a color display, capable of, using a small-scale circuit, self-adjusting its white balance characteristics both at the time of manufacturing the display and at the time of user's using the display.

According to a first aspect of the invention, there is provided a color display with a white balance self-adjusting function, comprising: a DC-voltage-level/gain adjusting circuit for receiving adjustment data, and adjusting, on the basis of the received adjustment data, the DC voltage level and the gain of each of signals passing through an input line for one of the group of R, G and B color signals and the group of color difference signals relating to the R, G and B color signals, respectively, thereby outputting the adjusted signals; a CRT driving circuit for receiving the output signals of the DC-voltage-level/gain adjusting circuit, and outputting driving signals; a color CRT having cathode electrodes corresponding to the R, G and B color signals, the color CRT performing display when the driving signals of the CRT driving circuit are applied to the cathode electrodes; a cathode current detecting circuit connected to the cathode electrodes of the color CRT for detecting cathode currents corresponding to the R, G and B color signals; and a control circuit connected to the cathode current detecting circuit and including non-volatile memories, the control circuit applying black and white reference level voltages, at predetermined points of time, to the input line for one of the group of the R, G and B color signals and the group of the color difference signals, comparing detection values from the cathode current detecting circuit, with preset reference values, generating data on the basis of comparison results, storing the generated data in the non-volatile memories, and reading and supplying the stored data as adjustment data to the DC-voltage-level/gain adjusting circuit.

According to a second aspect of the invention, there is provided a color display with a white balance self-adjusting function, comprising: a DC-voltage-level/gain adjusting circuit for receiving adjustment data, and adjusting, on the basis of the received adjustment data, the DC voltage level and the gain of each signal passing through an input line for one of the group of R, G and B color signals and the group of color difference signals relating to the R, G and B color signals, respectively, thereby outputting the adjusted signals; a CRT driving circuit for receiving the output signals of the DC-voltage-level/gain adjusting circuit, and outputting driving signals; a color CRT having cathode electrodes corresponding to the R, G and B color signals, the color CRT performing display when the driving signals of the CRT driving circuit are applied to the cathode electrodes; a cathode current detecting circuit connected to the cathode electrodes of the color CRT for detecting cathode currents corresponding to the R, G and B color signals; and a control circuit including non-volatile memories storing initial data, the control circuit reading the initial data from the non-volatile memories for a predetermined period of time after turn on of the display, thereby supplying the initial data, as the adjustment data, to the DC-voltage-level/gain adjusting circuit.

According to a third aspect of the invention, there is provided a method of self-adjusting the white balance of a color display having a DC-voltage-level/gain adjusting circuit for adjusting the DC voltage level and the gain of each signal passing through an input line for one of the group of R, G and B color signals and the group of color difference signals relating to the R, G and B color signals, respectively, thereby outputting the adjusted signals, a CRT driving circuit for receiving the output signals of the DC-voltage-level/gain adjusting circuit, and outputting driving signals; a color CRT having cathode electrodes corresponding to the R, G and B color signals, the color CRT performing display when the driving signals of the CRT driving circuit are applied to the cathode electrodes; a cathode current detecting circuit connected to the cathode electrodes of the color CRT for detecting cathode currents corresponding to the R, G and B color signals; and non-volatile memories storing initial data used as adjustment data for adjusting the DC voltage level and the gain of each signal passing through the input line for one of the group of R, G and B color signals and the group of color difference signals; the method comprising the steps of: reading the initial data from the non-volatile memories for a predetermined period of time after turn on of the display, and supplying the DC-voltage-level/gain adjusting circuit with the initial data as adjustment data thereby to adjust the DC voltage level and the gain of the DC-voltage-level/gain adjusting circuit; comparing a current value detected by the cathode current detecting circuit with a preset reference value for the predetermined period of time after the turn on of the display, and generating data indicative of the comparison result; and updating the contents of the non-volatile memories on the basis of the generated data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention

DETAILED DESCRIPTION OF THE INVENTION

The embodiments of the invention will be described with reference to the accompanying drawings. The invention, however, is not limited to the embodiments but may be modified in various manners without departing from the technical scope thereof.

Figure 1:
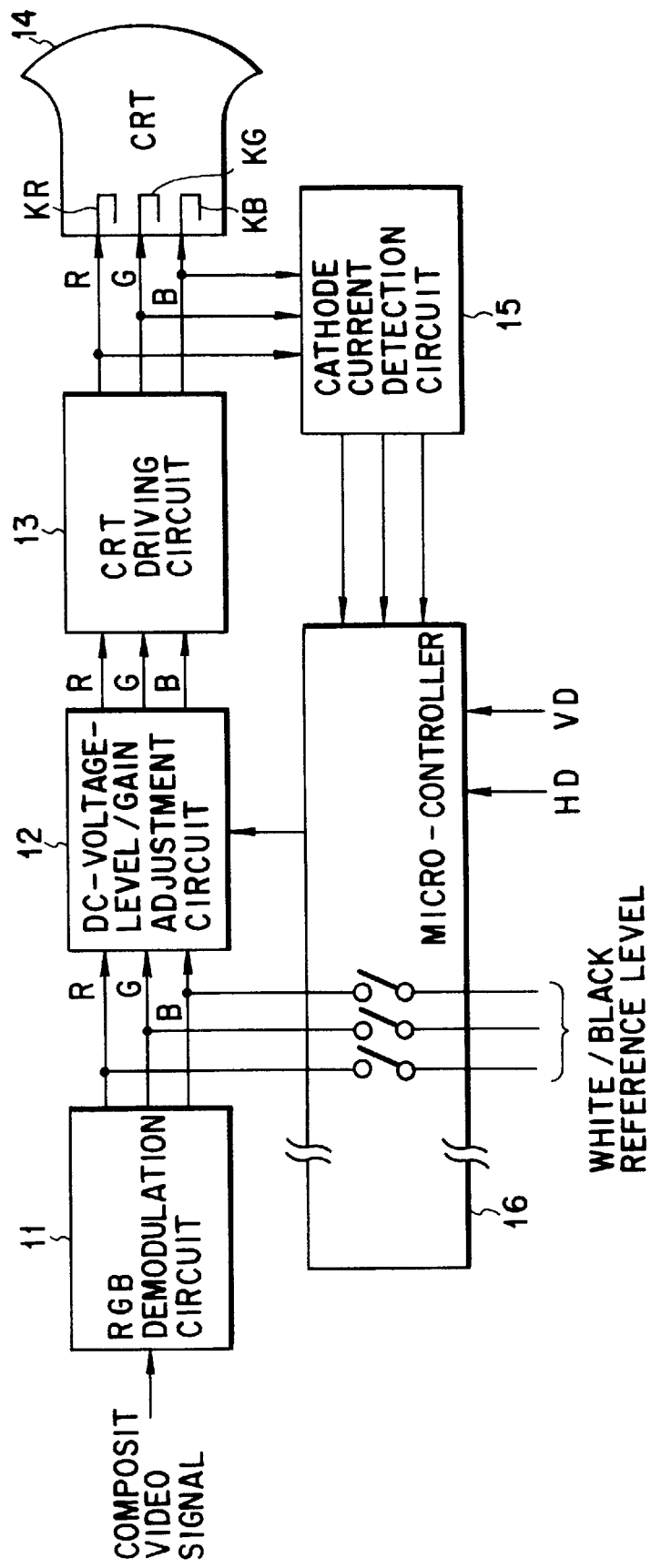
FIG. 1 is a block diagram, showing a white balance self-adjusting apparatus according to an embodiment of the invention.

In a color TV display shown in FIG. 1, a RGB demodulation circuit 11 demodulates each of three primary color (R (Red), G (Green) and B (Blue)) signals, and outputs the modulated signal. Each primary color signal demodulated by the RGB demodulation circuit 11 is supplied to a DC-voltage-level/gain adjustment circuit 12. The DC-voltage-level/gain adjustment circuit 12 adjusts the DC voltage level and the gain of each primary color signal on the basis of an adjusting data from a micro-controller (a controlling microcomputer), which will be described later, and outputs the adjusted signal to a CRT driving circuit 13. The driving circuit 13 in turn outputs CRT driving signals (a cathode voltage application signal, etc.) for driving a color CRT 14. When the CRT driving signals are supplied to the cathode electrodes KR, KG, KB of the color CRT 14, an image is displayed. The cathode current (brightness signals) of the color CRT 14 are detected by a cathode current detection circuit 15. The detection values of the detection circuit 15 are supplied to a micro-controller 16.

The micro-controller 16 contains a central processing unit (CPU), a Read Only Memory (ROM) storing control programs and data, a non-volatile memory storing adjusting data, etc. (which are not shown), and has a self-adjusting function for controlling the self-adjustment of various characteristics including white balance characteristics, as well as a usual function for selecting a channel to be received. A control program for controlling the operation of the micro-controller 16 is activated by a key operation signal from a remote control transmitter (not shown).

At the time of self-adjustment of the white balance characteristics, the micro-controller 16 applies a black reference level voltage and a white reference level voltage for each of the RGB electron guns, to the DC-voltage-level/gain adjustment circuit 12 at predetermined points of time on the basis of a horizontal driving pulse signal HD and a vertical driving pulse signal VD output from other circuits incorporated in the color TV display. Further, the micro-controller 16 controls the DC voltage level adjusting operation and the gain adjusting operation of the DC-voltage-level/gain adjustment circuit 12 on the basis of the detection value of the cathode current detection circuit 15.

The aforementioned black and white reference level voltages are generated from other circuits in the color TV display.

Figure 3:
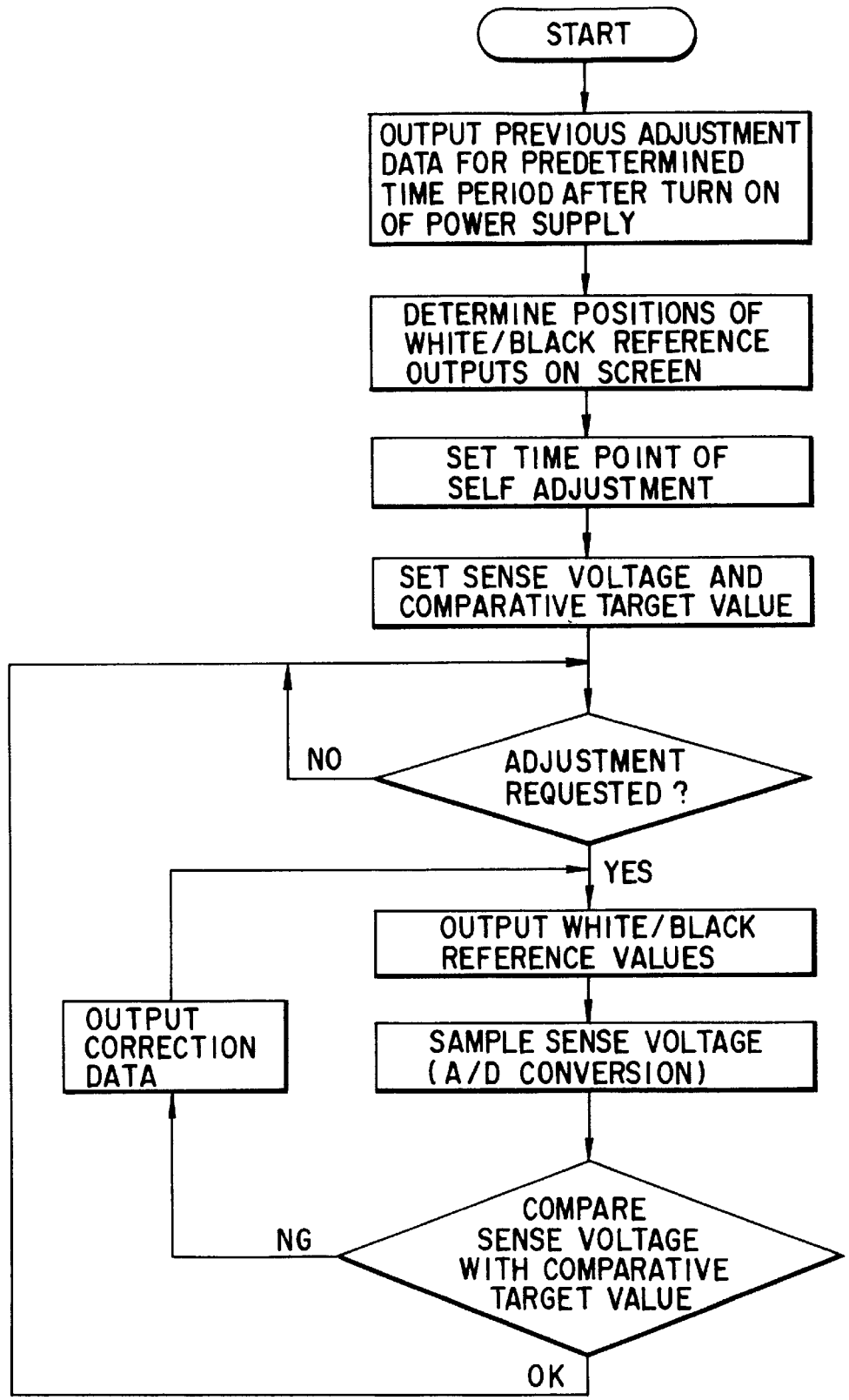
FIG. 3 is a flowchart, useful in explaining the adjusting operation of the apparatus of FIGS. 1 and 2.

An example of the adjusting operation of the white balance characteristics is illustrated in the flowchart of FIG. 3.

Figure 2:
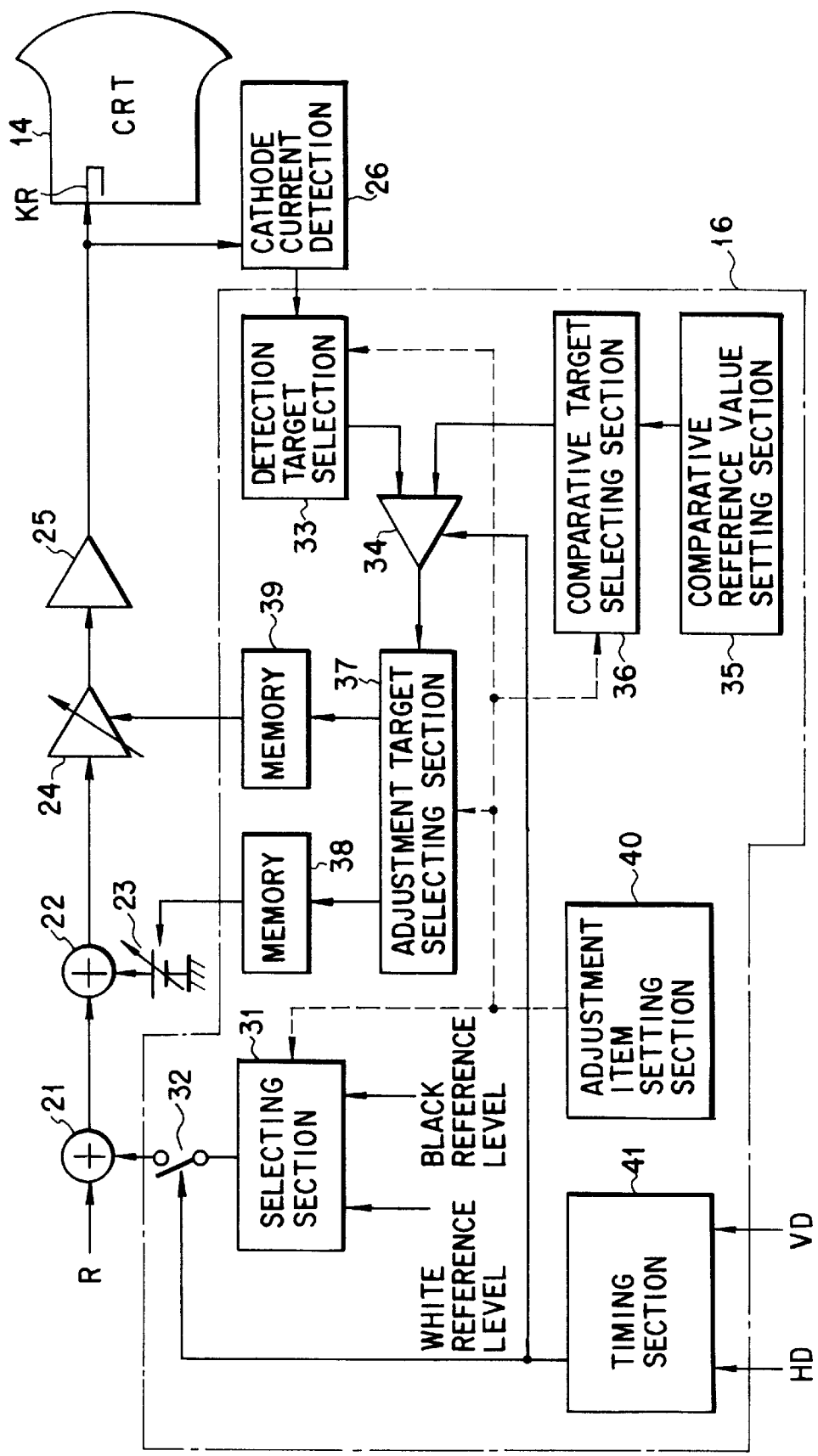
FIG. 2 is a block diagram, showing the apparatus of FIG. 1 in more detail.

FIG. 2 shows, in more detail, only those circuit portions included in the DC-voltage-level/gain adjustment circuit 12, the CRT driving circuit 13, the color CRT 14 and the cathode current detection circuit 15 shown in FIG. 1, which relate to the R (Red) color signal of the three primary color signals. In other words, FIG. 2 is a view, useful in explaining that control operation included in the adjusting operation of the white balance characteristics shown in the flowchart of FIG. 3, which relates to the R color signal.

A R color signal included in the three primary color signals is supplied to an input terminal of a second adder 22 via a first adder 21. The other input terminal of the second adder 22 receives a DC voltage from a variable DC bias voltage source 23 whose output level is variable. The second adder 22 and the variable DC bias voltage source 23 constitute a DC voltage level adjustment circuit incorporated in the DC-voltage-level/gain adjustment circuit 12.

The output of the second adder 22 is input to a variable gain amplifier 24. The variable gain amplifier 24 constitutes a gain adjustment circuit included in the DC-voltage-level/ gain adjustment circuit 12.

The output of the variable gain amplifier 24 is input to an amplifier 25 which amplifies a R (red) signal in the CRT driving circuit 13. The output of the amplifier 25 is applied to the cathode electrode KR of the color CRT 14 which corresponds to the R signal. The cathode current flowing through the cathode electrode KR corresponding to the R signal is detected by a cathode detecting section 26 in the cathode current detection circuit 15.

The micro-controller 16 performs the following operations (1)–(10):

(1) To select one of a white reference level voltage and a black reference level voltage which correspond to each of three primary color signals (selecting section 31);

(2) To control the white or black reference level voltage selected by the selecting section 31, and then supplies the controlled level to the first adder 21;

(3) To receive a detection value from the cathode current detecting section 26 corresponding to the R signal, and detection values from current detecting sections which detect the cathode currents flowing through cathode electrodes corresponding to the G (green) and B (blue) signals, and select one of the detection values (detection target selecting section 33);

(4) To compare the output of the detection target selecting section 33 with a comparative reference value (comparing section 34);

(5) To set a plurality of comparative reference values to be used in the comparing operation of the comparing section 34 (comparative reference value setting section 35);

(6) To select that one of the comparative reference values set in the comparative reference value setting section 35, which corresponds to the output of the detection target selecting section 33, and supply the selected one to the comparing section 34 (comparative target selecting section 36);

(7) To select one of the comparison results of the comparing section 34, and supply the same to nonvolatile memories 38 and 39 (adjustment target selecting section 37);

(8) To supply the variable DC bias voltage source 23 and the gain control amplifier 24 with the data items of the non-volatile memories 38 and 39 as adjustment data items, respectively;

(9) To control the selecting operations of the selecting section 31, the detection target selecting section 33, the comparative target selecting section 36 and the adjustment target selecting section 37 (adjustment item setting section 40); and

(10) To receive the horizontal driving pulse signal HD and the vertical driving pulse signal VD, and control the operations of the output control section 32 and the comparing section 34 on the basis of the pulse signals (timing control section 41).

Adjustment of the white balance characteristics is performed in the manufacturing stage of the color display or in the aftercare stage thereof after the display is put to market, by, for example, operating a particular combination of keys on a remote controller (not shown), which is not usually used.

Referring then to the flowchart of FIG. 3, the adjustment operation of the white balance characteristics will be described.

When the power supply of the color TV display is turned on, adjustment data (initial data) items prestored in the non-volatile memories 38 and 39 are supplied to the variable DC bias voltage source 23 and the variable gain amplifier 24. Since the current flowing through the cathode electrodes of the color CRT 14 is not stable immediately after the turn on of the power supply, the adjustment data items prestored in the memories 38 and 39 are used in the initial state. The adjustment data items are used for e.g. about 5 seconds after the turn on of the power supply.

When the adjustment data items are input, the DC voltage level adjusting circuit consisting of the second adder 22 and the variable DC bias voltage source 23 adjusts the DC voltage level corresponding to the R (red) signal, while the variable gain amplifier 24 adjusts the gain corresponding to the R signal.

Then, the timing control section 41 performs position setting for outputting the white and black reference level voltages to those positions on the CRT screen which correspond to the time points of input of the horizontal driving pulse signal HD and the vertical driving pulse signal VD, respectively. In general, the display positions of the white and black reference level voltages are set outside the frame, and hence cannot be seen from the external. However, the positions are not limited to these.

Thereafter, the time points at the time of adjusting the white balance characteristics, at which the selecting section 31 and the comparing section 34 are operated, are set.

Subsequently, the time point is set at which that one of a plurality of comparative reference values set in the comparative reference value setting section 35 and corresponding to the black and white reference level voltages for the R, G and B primary color signals, which corresponds to the output of the detection target selecting section 33, is selected and supplied to the comparing section 34.

Then, it is determined whether there is a request for adjusting the white balance characteristics. If there is the request, the selecting section 31 selects, for example, one black reference level voltage, and then the output control section 32 operates at a preset time point, thereby supplying the first adder 21 with the black reference level voltage selected by the selecting section 31. Thereafter, that output of the amplifier 25 which corresponds to the selected black reference level voltage is applied to the cathode electrode KR corresponding to the R signal of the color CRT 14, and the cathode current at this time is detected by the cathode current detecting section 26. The detection value is sampled (subjected to A/D conversion) and supplied to the detection target selecting section 33.

Thus, the detection target selecting section 33 selects the detection value corresponding to the R signal, and supplies it to the comparing section 34. At this time, the comparative target selecting section 36 selects that one of the comparative reference values set in the comparative reference value setting section 35, which corresponds to the black reference level voltage for the R primary color signal. The selected detection value is compared with the selected comparative reference value in the comparing section 34. If both values are identical, it is again determined whether there is a request for adjusting the white balance characteristics.

On the other hand, if it is determined that the detection value is not identical to the comparative reference value, correction data is output from the comparing section 34 to the non-volatile memory 38 via the adjustment target selecting section 37. In the memory 38, DC voltage level adjustment data is updated. The update operation of the adjustment data is repeated until the comparing section 34 generates an output indicating that the detection value and the comparative reference value is identical to each other. Thus, where the comparative reference value corresponding to the black reference level voltage for the R (red) primary color signal is selected, the DC voltage level is adjusted.

After the adjustment operation is completed, the selecting section 31 selects one white reference level voltage. Thereafter, in a manner similar to the case of selecting the black reference level voltage, the output control section 32 is operated at a preset point of time, thereby applying the selected white reference level voltage to the first adder 21, and applying the output of the amplifier 25 corresponding to the white reference level voltage, to the cathode electrode of the color CRT 14 corresponding to the R (red) signal. At this time, the cathode current is detected by the cathode current detecting section 26, sampled (A/D conversion), and supplied to the detection target selecting section 33.

Thus, the detection target selecting section 33 selects the detection value corresponding to the R (red) primary color signal, and supplies it to the comparing section 34. At this time, the comparative target selecting section 36 selects that one of the comparative reference values set in the comparative reference value setting section 35, which corresponds to the white reference level voltage for the R (red) primary color signal. The selected detection value is compared with the selected comparative reference value in the comparing section 34. If it is determined that the detection value is not identical to the comparative reference value, correction data is output from the comparing section 34 to the non-volatile memory 39 via the adjustment target selecting section 37. In the memory 39, DC voltage level adjustment data is updated. The update operation of the adjustment data is repeated until the comparing section 34 generates an output indicating that the detection value and the comparative reference value is identical to each other. Thus, where the comparative reference value corresponding to the white reference level voltage for the R (red) primary color signal is selected, the DC voltage level is adjusted.

The same adjusting operation as above is performed in the case of the G (green) primary color signal and the B (blue) primary color signal.

When in the apparatus constructed as above, self-adjustment mode for white balance characteristics is designated from the external of the apparatus at the time of manufacturing the display or at any time after the display is put to market, each reference level voltage for self-adjustment is selected by the micro-controller 16, thereby starting self-adjustment of white balance characteristics. At this time, closed-loop control is sequentially performed for each of the R, G and B primary color signals, so as to make the detection value of each color signal identical to its reference value. Thus, the DC voltage level and the gain of each color signal are adjusted.

In the apparatus shown in FIGS. 1 and 2, the white balance characteristics of the TV display can be easily self-adjusted at the time of manufacturing the display or at any time after the display is put to market, by modifying the software (program) of the conventional micro-controller 16 such that a self-adjusting function is added and a self-adjustment control function for designating the start point of self adjustment from the external of the display is added, and by imparting to the controller 16 a small capacity memory circuit such as a non-volatile memory for storing adjusting data.

Moreover, since in the above-described embodiment, initial data is stored in a non-volatile memory, and read to perform adjustment after the power supply of the display is turned on, the CRT screen of the display is prevented from intensely flashing in white immediately after the power supply is turned on, which may well occur in the conventional case where an analog voltage is applied to the capacitor.

In addition, although in the embodiment, the black and white reference level voltages are generated from a circuit incorporated in the color TV display other than the micro-controller 16, the invention may be modified such that those levels are generated from the micro-controller 16.

Figure 4:
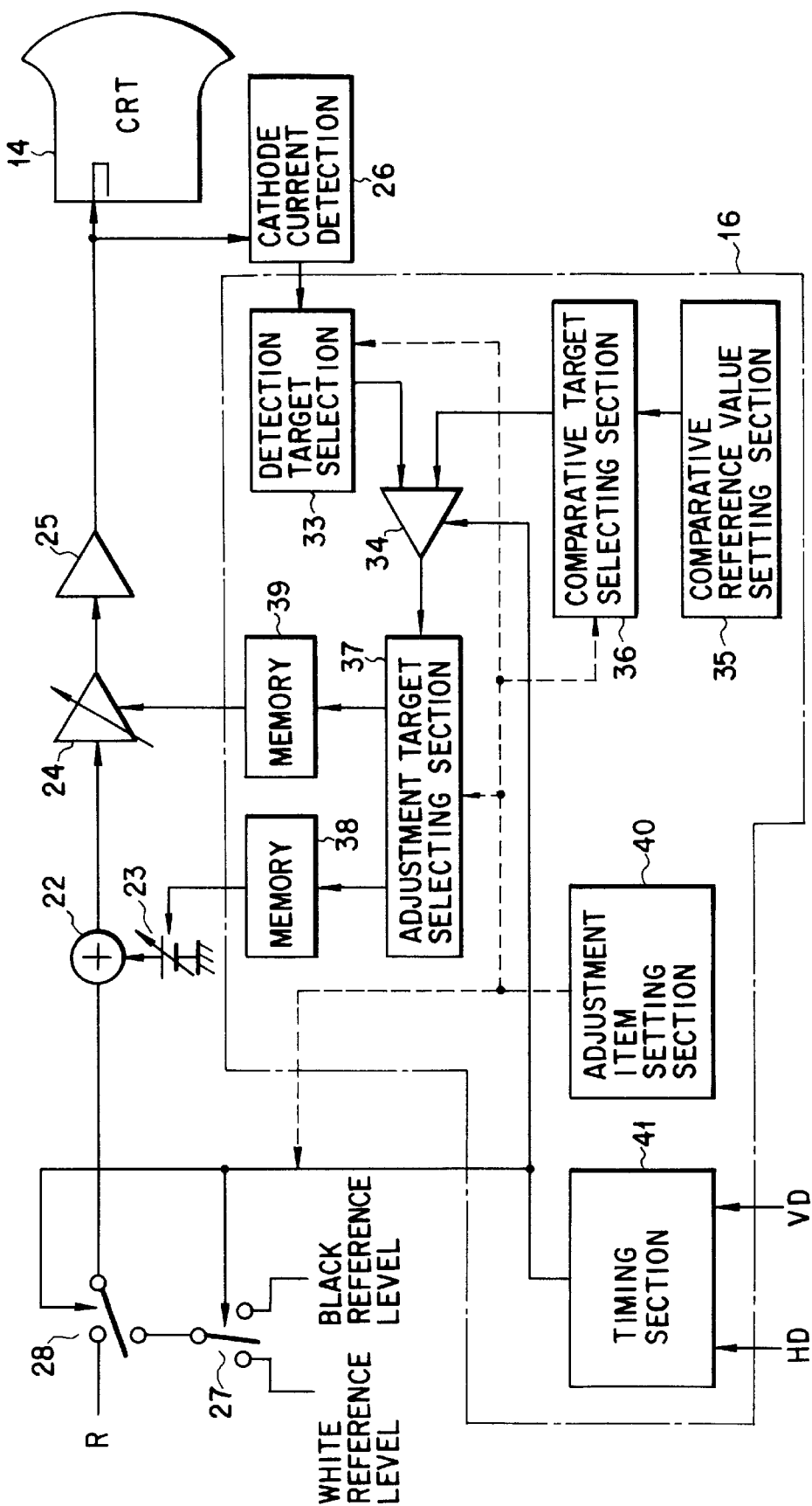
FIG. 4 is a block diagram, showing a white balance self-adjusting apparatus according to another embodiment of the invention.

FIG. 4 is a block diagram, showing a color TV display with a white balance self-adjustment apparatus according to another embodiment of the invention.

In this embodiment, two switch circuits 27 and 28 are employed in place of the first adder 21, and their operation timing is controlled by the adjustment item setting section 40 and the timing control section 41. At the time of self-adjustment of the white balance characteristics, the white or black reference voltage is applied to the second adder 22 via the switch circuits 27 and 28. At the time of usual operation, the R (red) signal is supplied to the second adder 22 via the switch circuit 28. Furthermore, although in the above-described embodiments, each of the R, G and B primary color signals is obtained by demodulating a composite video signal thereby to adjust the DC voltage level and the gain of the signal, it may be modified such that a color difference signal (R−Y), (G−Y) and (B−Y) relating to each of the R, G and B primary color signals and a brightness signal Y is obtained by demodulating the composite video signal, and then the color difference signal is adjusted.

Although in the above-described embodiments, the invention is applied to a color TV display, it is a matter of course that the invention is also applicable to self-adjustment of the white balance of a color monitor for a personal computer, etc.

As described above, the invention can easily perform self-adjustment of the white balance characteristics of a display, using a small-scale circuit, at the time of manufacturing the display or at the time of using the same. As a result, the degree of free of the self-adjustment is significantly enhanced, thereby facilitating the aftercare of the display after it is put to market, and increasing the added value of the display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A color display with a white balance self-adjusting function, comprising:

a DC-voltage-level and gain adjusting circuit for receiving adjustment digital data, and adjusting, on the basis of the received adjustment digital data, the DC voltage level and the gain of each signal passing through an input line for one of the group of R, G and B color signals, thereby outputting the adjusted signals;

a CRT driving circuit for receiving the output signals of the DC-voltage-level and gain adjusting circuit, and outputting driving signals;

a color CRT having cathode electrodes corresponding to the R, G and B color signals, the color CRT performing display when the driving signals of the CRT driving circuit are applied to the cathode electrodes;

a cathode current detecting circuit connected to the cathode electrodes of the color CRT for detecting cathode currents corresponding to the R, G and B color signals; and a control circuit of a program control method connected to the cathode current detecting circuit and including non-volatile memories with pre-stored data, wherein the control circuit operates by following steps of:

a first processing step of reading out the data pre-stored in the non-volatile memories for a predetermined period of time after turning on the display the pre-stored data read out in the first processing step being supplied to the DC-voltage-level and gain adjusting circuit, thereby setting the DC-voltage-level and the gain in the DC-voltage-level and gain adjusting circuit;

a second processing step of detecting whether adjustment is requested;

a third processing step of selecting black and white reference level voltages when the adjustment is requested;

a fourth processing step of comparing detection values which are detected from the cathode current detecting circuit after the DC-voltage-level and the gain are set in the DC-voltage-level and gain adjusting circuit based on the data read out in the first processing step, with the black and white reference level voltages selected in the third processing step; and a fifth processing step of (i) updating the data stored in the non-volatile memories: or (ii) stopping updating of the data, on the basis of comparison results, the data updated in the fifth step being imparted to the DC-voltage-level and gain adjusting circuit, thereby re-setting the DC-voltage-level and the gain in the DC-voltage-level and gain adjusting circuit.

2. The color display according to claim 1, wherein the control circuit operates further by the following sixth step of selectively outputting the black and white reference level voltages to the input line for the group of the R, G and B color signals at a predetermined point of time, respectively.

3. The color display according to claim 2, wherein the timing of selectively outputting the white and black reference level voltages is based on the timing of a horizontal driving pulse signal and a vertical driving pulse signal.

4. The color display according to claim 3, wherein the timing of selectively outputting the black and white reference voltages is based on the timing of the horizontal driving pulse signal and the vertical driving pulse signal, and wherein an image corresponding to the black and white reference level voltages is displayed outside the frame which is invisible from the outside of the color CRT.

5. The color display according to claim 1, wherein in the third step, the black and white reference level voltages are selected from a plurality of the black and a plurality of the white reference level voltages.

6. The color display according to claim 1, wherein both of the black and white reference level voltages are selected for each of the R, G and B color signals in the third processing step.

7. The color display according to claim 1, wherein the DC-voltage-level and gain adjusting circuit includes:

a DC voltage level adjusting circuit for receiving the adjustment digital data, and adjusting, on the basis of the adjustment digital data, the DC voltage level of input of one of the R, G and B color signals, thereby outputting the adjusted signals; and a gain adjusting circuit for receiving the adjustment digital data and the output of the DC voltage level adjusting circuit, and adjusting the gain of the output of the DC voltage level adjusting circuit on the basis of the adjustment digital data.

8. The color display according to claim 7, wherein the DC voltage level adjusting circuit includes:

a variable DC bias voltage source for receiving the adjustment digital data and outputting a DC voltage corresponding to the adjustment digital data; and an adder for adding the DC voltage output from the variable DC bias voltage source, to a signal passing through the input line for one of the group of the R, G and B color signals.

* * * * *